US010471732B2

(12) United States Patent
Furuta

(10) Patent No.: US 10,471,732 B2
(45) Date of Patent: Nov. 12, 2019

(54) PRINTING APPARATUS AND PRINTING CONTROL APPARATUS

(71) Applicant: SEIKO EPSON CORPORATION, Tokyo (JP)

(72) Inventor: Tatsuo Furuta, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/163,752

(22) Filed: Oct. 18, 2018

(65) Prior Publication Data
US 2019/0118550 A1 Apr. 25, 2019

(30) Foreign Application Priority Data

Oct. 20, 2017 (JP) ................. 2017-203334

(51) Int. Cl.
B41J 2/21 (2006.01)
G06K 15/10 (2006.01)
B41J 2/14 (2006.01)
B41J 2/11 (2006.01)
B41J 2/01 (2006.01)

(52) U.S. Cl.
CPC ............ *B41J 2/2135* (2013.01); *B41J 2/11* (2013.01); *B41J 2/14* (2013.01); *B41J 2/2132* (2013.01); *B41J 2/2146* (2013.01); *G06K 15/107* (2013.01); *B41J 2/01* (2013.01)

(58) Field of Classification Search
CPC ...... B41J 2/2135; B41J 2/2132; B41J 2/2146; B41J 2/14; B41J 2/11; B41J 2/01; G06K 15/107
See application file for complete search history.

(56) References Cited

U.S. PATENT DOCUMENTS

2011/0148956 A1 6/2011 Nakaara
2011/0221800 A1* 9/2011 Ikeda ................. H04N 1/6033
347/3
(Continued)

FOREIGN PATENT DOCUMENTS

JP 2001-001510 A 1/2001
JP 2010-000684 A 1/2010
(Continued)

Primary Examiner — Yaovi M Ameh

(57) ABSTRACT

Provided is a printing apparatus configured to execute printing by a print head including an overlapping portion where a formation range of a first nozzle group and a formation range of a second nozzle group configured to eject ink of a same color as the first nozzle group at least partially overlap, wherein the printing apparatus includes an HT processing unit configured to generate HT data specifying a presence or absence of dots for each pixel based on image data, and a distribution processing unit configured to distribute the HT data into first HT data for driving the first nozzle group, and second HT data for driving the second nozzle group. The distribution processing unit is configured to define a switching position between the first nozzle group and the second nozzle group in the overlapping portion, based on a dot formation frequency of each nozzle position in the overlapping portion specified by, among the HT data, specific HT data corresponding to the overlapping portion, and distribute the specific HT data into the first HF data and the second HT data, based on the switching position.

6 Claims, 7 Drawing Sheets

(56) References Cited

U.S. PATENT DOCUMENTS

2012/0206525 A1\* 8/2012 Tanase ................... B41J 2/155
                                                        347/14
2014/0292860 A1\* 10/2014 Furuhata ................. B41J 2/07
                                                        347/13

FOREIGN PATENT DOCUMENTS

| JP | 2011-126264 A | 6/2011 |
| JP | 2014-008660 A | 1/2014 |

\* cited by examiner

PRINTING APPARATUS AND PRINTING CONTROL APPARATUS

BACKGROUND

1. Technical Field

The invention relates to a printing apparatus and a printing control apparatus.

2. Related Art

There are known printers that perform printing using a print head formed by overlapping nozzle rows of a plurality nozzles aligned side by side at end portions of the nozzle rows.

Further, there has been disclosed a technique related to an ink jet recording device configured to prevent deterioration in an image quality recorded in an overlapping region of recording heads (deterioration of image quality caused by misalignment of recording heads) (refer to JP-A-2014-008660).

In JP-A-2014-008660, within the overlapping region, recording data for a character object is distributed between horizontally adjacent recording heads with a first end of the character object serving as a boundary. At this time, the boundary is set from a longitudinally recorded line, and the recording data is allocated based on the boundary.

In JP-A-2014-008660, depending on the recording data, a longitudinally recorded line may not exist, such as when a graphic object occupies a total width of the overlapping region or when a gap does not exist between characters. In such a case, similar to the related art, a halftone mask configured to perform recording using both adjacent recording heads is used (paragraph 0047 of JP-A-2014-008660), resulting in deterioration of print quality.

SUMMARY

The invention provides a printing apparatus and a printing control apparatus configured to improve a quality of printing using a plurality of nozzle groups that overlap.

An aspect according to the invention provides a printing apparatus configured to execute printing by a print head including an overlapping portion where a formation range of a first nozzle group configured to eject ink and a formation range of a second nozzle group configured to eject ink of a same color as the first nozzle group at least partially overlap, wherein the printing apparatus includes a halftone processing unit configured to generate halftone data specifying a presence or absence of dots for each pixel based on image data, and a distribution processing unit configured to distribute the halftone data into first halftone data for driving the first nozzle group, and second halftone data for driving the second nozzle group. The distribution processing unit is configured to define a switching position between the first nozzle group and the second nozzle group in the overlapping portion, based on a dot formation frequency of each nozzle position in the overlapping portion specified by, among the halftone data, specific halftone data corresponding to the overlapping portion, and distribute the specific halftone data into the first halftone data and the second halftone data, based on the switching position.

According to the configuration, the printing apparatus includes the print head provided with the first nozzle group and the second nozzle group that overlap. When distributing the halftone data into the first halftone data for driving the first nozzle group and the second halftone data for driving the second nozzle group, the printing apparatus defines the switching position between the first nozzle group and the second nozzle group in the overlapping portion, based on the dot formation frequency of each nozzle position in the overlapping portion specified by, among the halftone data, specific halftone data corresponding to the overlapping portion. Then, based on the defined switching position, the printing apparatus distributes the specific halftone data into the first halftone data and the second halftone data. That is, the printing apparatus can define the switching position corresponding to a position within the specific halftone data that has the impact as small as possible on print quality and, as a result, achieve a favorable print quality that minimizes image quality deterioration caused by misalignment between the first nozzle group and the second nozzle group.

According to a further aspect of the invention, the distribution processing unit may be configured to define a nozzle position range formed by a predetermined number of nozzle positions that are in sequence and included in the overlapping portion as the switching position, and distribute each pixel constituting pixel rows within the specific halftone data corresponding to the nozzle position range defined as the switching position into the first halftone data and the second halftone data at a predetermined distribution ratio.

According to the configuration, the printing apparatus can define the nozzle position range corresponding to the position (predetermined number of pixel rows in sequence) within the specific halftone data having the impact as small as possible on print quality as the switching position. As a result, a favorable print quality that minimizes image quality deterioration caused by misalignment between the first nozzle group and the second nozzle group is achieved.

According to a still further aspect of the invention, the distribution processing unit may be configured to define a nozzle position range having, among the nozzle position ranges included in the overlapping portion, a smallest sum total of the dot formation frequencies as the switching position.

According to the configuration, the printing apparatus can define at a high probability the nozzle position range corresponding to the position (predetermined number of pixel rows in sequence) within the specific halftone data having the impact as small as possible on print quality as the switching position.

According to a still further aspect of the invention, the distribution processing unit may, when a plurality of the nozzle position ranges having a smallest sum total of the dot formation frequencies exist in the overlapping portion, be configured to define the nozzle position range having, among the plurality of nozzle position ranges, a smallest maximum value of the dot formation frequency as the switching position.

According to the configuration, the printing apparatus can reliably define the nozzle position range corresponding to the position (predetermined number of pixel rows in sequence) within the specific halftone data having the impact as small as possible on print quality as the switching position.

According to a still further aspect of the invention, the distribution processing unit may be configured to detect, for each nozzle position in the overlapping portion, a neighbor frequency of a dot and a dot of a neighbor nozzle position and, when a nozzle position having a neighbor frequency of 0 exists, define the nozzle position having the neighbor frequency of 0 as the switching position and distribute the specific halftone data into the first halftone data and the second halftone data, based on the switching position and, when a nozzle position having a neighbor frequency of 0 does not exist, define the nozzle position range as the switching position, and distribute each pixel constituting the pixel row corresponding to the nozzle position range defined as the switching position into the first halftone data and the second halftone data at the distribution ratio.

According to the configuration, the printing apparatus can define the switching position corresponding to the position within the specific halftone data that is not susceptible to impact of misalignment between the first nozzle group and the second nozzle group, based on an indicator referred to as the neighbor frequency of each nozzle position in the overlapping portion.

Achievement of the technical concept of the invention is not limited to the printing apparatus. Other examples include a printing control apparatus configured to control printing by the print head. The printing control apparatus includes a halftone processing unit configured to generate halftone data specifying a presence or absence of dots for each pixel based on image data, and a distribution processing unit configured to distribute the halftone data into first halftone data for driving the first nozzle group, and second halftone data for driving the second nozzle group. The distribution processing unit is configured to define a switching position between the first nozzle group and the second nozzle group in the overlapping portion, based on a dot formation frequency of each nozzle position in the overlapping portion specified by, among the halftone data, specific halftone data corresponding to the overlapping portion, and distribute the specific halftone data into the first halftone data and the second halftone data, based on the switching position. Further, methods (a printing method, a printing control method) that include processing executed by a printing apparatus or a printing control apparatus, a program that executes these methods on a computer, and a computer readable storage medium storing a program are also respectively established as still further aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
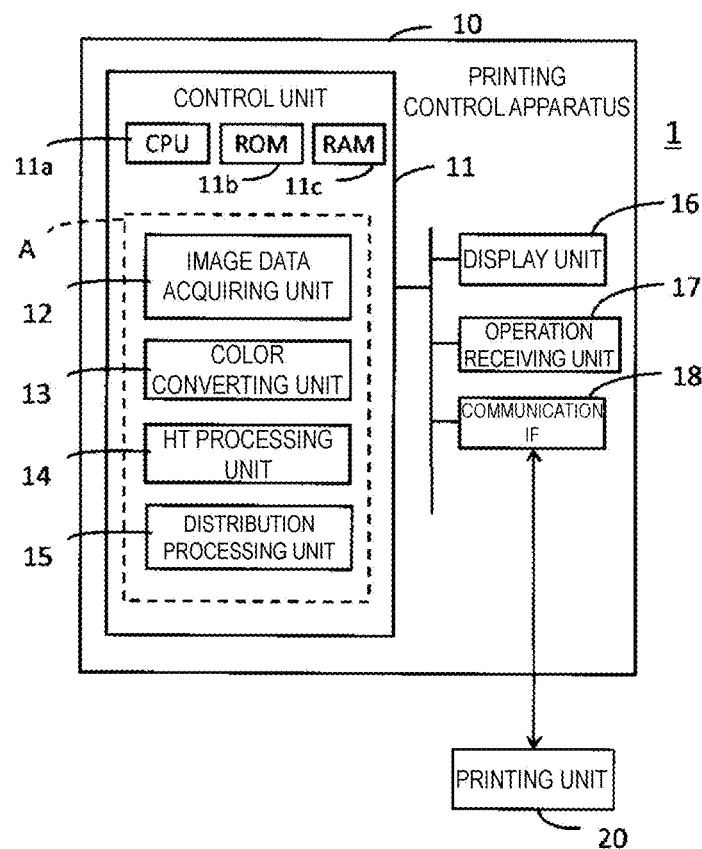
FIG. 1 is a diagram simply illustrating an apparatus configuration.

Exemplary embodiments of the invention are described below with reference to the drawings. Note that each of the drawing is merely an illustration for explaining the exemplary embodiments. Additionally, the drawings may be inconsistent with each other.

1. Outline Description of Apparatus Configuration

FIG. 1 simply illustrates an apparatus configuration according to the present exemplary embodiment. A printing control apparatus 10 includes, for example, a control unit 11, a display unit 16, an operation receiving unit 17, a communication interface (IF) 18, and the like. The printing control apparatus 10 is, for example, realized by a personal computer (PC) or an information processing apparatus having the same level of processing capacity as a PC. Further, hardware configured to realize the control unit 11 according to the present exemplary embodiment may be termed a printing control apparatus. The printing control apparatus may be termed an image processing device.

The control unit 11 is provided with one or a plurality of integrated circuits (ICs) including a CPU 11a, a ROM 11b, a RAM 11c, and the like, storage media such as other memory and a hard disk drive, and the like, as appropriate. In the control unit 11, the CPU 11a controls a behavior of the printing control apparatus 10 by executing arithmetic processes in accordance with a program stored on the ROM 11b and the like using the RAM 11c and the like as a work area. The control unit 11 is equipped with a program A, and realizes each function such as an image data acquiring unit 12, a color converting unit 13, a halftone (HT) processing unit 14, and a distribution processing unit 15 in accordance with the program A. The program A can be termed an image processing program, a print control program, a printer driver, and the like.

The communication IF 18 is a general term for an IF that allows the control unit 11 to execute communication with sources outside the printing control apparatus 10 in conformity with predetermined communication standards. The display unit 16 is a means for visibly displaying information, and includes a liquid crystal display (LCD), organic electroluminescence (EL) display, or the like, for example. The display unit 16 may include a display and a drive circuit for driving the display. The operation receiving unit 17 is a means for receiving operations by the user, and is realized by physical buttons, a touch panel, a mouse, a keyboard, and the like, for example. Naturally, the touch panel may be realized as one function of the display unit 16. Further, the display unit 16 may include the operation receiving unit 17 and be termed an operation panel or the like.

The printing control apparatus 10 is communicably coupled with a printing unit 20 via the communication IF 18. The printing unit 20 is a mechanism configured to execute printing based on print data generated by the printing control apparatus 10 (control unit 11). The printing control apparatus 10 and the printing unit 20 may be devices independent from each other. When the printing control apparatus 10 and the printing unit 20 are independent devices, the printing unit 20 can be termed a printing apparatus, and a configuration that includes the printing control apparatus 10 and the printing unit 20 can be termed a printing system 1.

Or, the printing control apparatus 10 and the printing unit 20 may, as a whole, be included in a single device. When the printing control apparatus 10 and the printing unit 20 are included in a single device, a configuration (single device) that includes the printing control apparatus 10 and the printing unit 20 can be termed the printing apparatus 1. The printing apparatus 1 has at least a printing function. Thus, the printing apparatus 1 may be a multifunction machine having a printing function as well as a plurality of other functions such as a scanner and facsimile.

Figure 2:
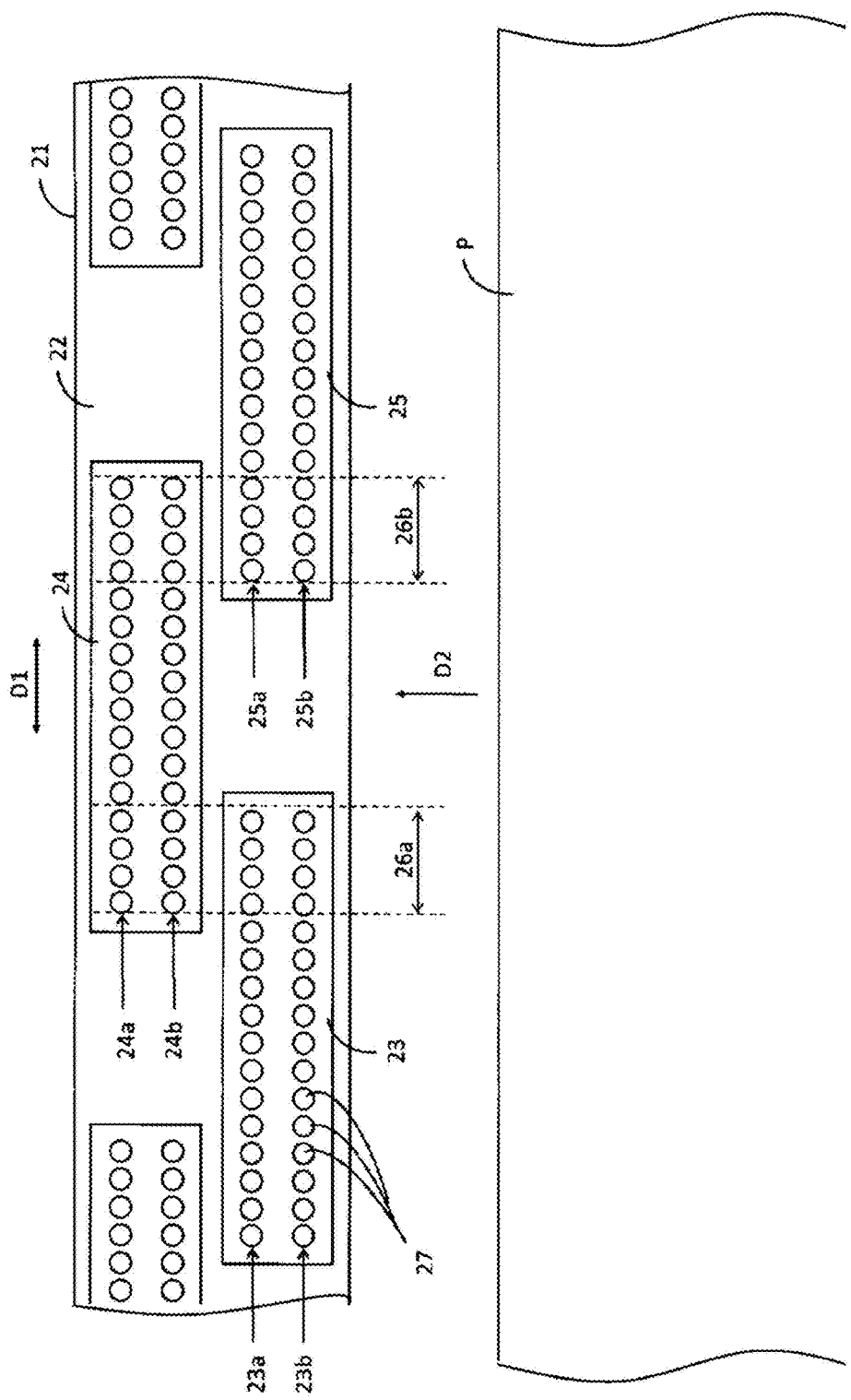
FIG. 2 is a diagram simply illustrating a print head and a printing medium.

FIG. 2 simply illustrates a print head 21 and a printing medium P of the printing unit 20. The printing unit 20, as a basic configuration, includes the print head 21 configured to eject a liquid such as ink, and a transport mechanism (not illustrated) for transporting the printing medium P. The print head 21 may be termed a recording head, a printing head, a liquid ejection (spray) head, or the like. The printing medium P is, representatively, paper, but may be a material other than paper as long as configured to record by ejection of a liquid.

The print head 21 is a line-type print head (line head) in which the direction that crosses a transport direction D2 of the printing medium P by the transport mechanism is a longitudinal direction D1. Here, the crossing is basically orthogonal. However, in the present exemplary embodiment, expressions such as orthogonal, parallel, and equally spaced apart may not mean orthogonal, parallel, or equally spaced apart in a strict sense due to various errors, inclination, and the like in the printing unit 20 as a product.

The print head 21 includes a plurality of nozzles 27 for ejecting ink or the like. The reference sign 22 denotes a nozzle surface 22 where the nozzles 27 open, and FIG. 2 illustrates an example of an array of the nozzles 27 on the nozzle surface 22. The print head 21 is formed by a plurality of head chips 23, 24, 25 . . . having the same configuration. The plurality of head chips 23, 24, 25 . . . are assembled to the print head 21 in the longitudinal direction D1 with end portions of the head chips 23, 24, 25 . . . overlapping in the longitudinal direction. While the three head chips 23, 24, 25 constituting the print head 21 in FIG. 2 are primarily described in an abbreviated manner, many head chips actually continue in the same way on an outer side of the head chip 23 and on an outer side of the head chip 25 with the end portions of the head chips overlapping. Such a print head 21 has a length in the longitudinal direction D1 that allows a width of the printing medium P (the width in the longitudinal direction D1) to be covered.

The head chips 23, 24, 25 are each a component made of metal, ceramic, wiring, and the like, and each includes the plurality of nozzles 27, a flow path configured to supply a liquid to each of the nozzles 27, an actuator for ejecting a liquid from each of the nozzles 27, and the like. In the example in FIG. 2, the head chips 23, 24, 25 each include two nozzle groups. Specifically, the head chip 23 includes the nozzle groups 23a, 23b, the head chip 24 includes the nozzle groups 24a, 24b, and the head chip 25 includes the nozzle groups 25a, 25b. The nozzle groups 23a, 23b, 24a, 24b, 25a, 25b each include a predetermined number of nozzles 27 equally spaced apart in a predetermined direction (nozzle alignment direction).

The head chips 23, 24, 25 are arranged in the print head 21 to make the nozzle alignment direction parallel with the longitudinal direction D1 of the print head 21. In the example in FIG. 2, the nozzle groups 23a, 23b, 24a, 24b, 25a, 25b each include the plurality of nozzles 27 linearly aligned, and thus the nozzle groups may be termed nozzle rows. However, the plurality of nozzles 27 constituting each of the nozzle groups may be disposed in a zig-zag form (in a staggered manner) in the nozzle alignment direction, for example.

In the example in FIG. 2, each nozzle 27 constituting the nozzle groups 23a, 24a, 25a is configured to eject ink of a same color (black (K) ink, for example). Further, each of the nozzles 27 constituting the nozzle groups 23b, 24b, 25b is configured to eject ink of a same color (cyan (C) ink, for example). Thus, in the nozzle group 23a and the nozzle group 24a, a relationship between the first nozzle group and the second nozzle group configured to eject ink of the same color (the K ink) is established. Similarly, in the nozzle group 24a and the nozzle group 25a as well, a relationship between the first nozzle group and the second nozzle group configured to eject ink of the same color (the K ink) is established. Similarly, in the nozzle group 23b and the nozzle group 24b as well, a relationship between the first nozzle group and the second nozzle group configured to eject ink of the same color (the C ink) is established, and similarly, in the nozzle group 24b and the nozzle group 25b as well, a relationship between the first nozzle group and the second nozzle group configured to eject ink of the same color (the C ink) is established.

Reference signs 26a, 26b denote overlapping portions where formation ranges of the first nozzle group and the second nozzle group configured to eject ink of the same color overlap. In the example in FIG. 2, these reference signs denote the overlapping portion 26a serving as the range in which the nozzle group 23a and the nozzle group 24a corresponding to the K ink overlap, and the range in which the nozzle group 23b and the nozzle group 24b corresponding to the C ink overlap, and the overlapping portion 26b serving as the range in which the nozzle group 24a and the nozzle group 25a corresponding to the K ink overlap, and the range in which the nozzle group 24b and the nozzle group 25b corresponding to the C ink overlap. That is, in the print head 21, each of the nozzle groups corresponding to ink of the same color overlaps with an adjacent nozzle group at a first end or with adjacent nozzle groups at both ends, in the longitudinal direction D1.

In FIG. 2, while descriptions are omitted, the print head 21, needless to say, includes nozzle groups for ejecting inks other than the ink C and the ink K (a magenta (M) ink and a yellow (Y) ink, for example) in a configuration similar to the configuration of the nozzle groups corresponding to the ink K and the ink C. That is, the print head 21 includes a plurality of units (head chip units) that continue in the longitudinal direction D1 as the plurality of head chips such as illustrated in FIG. 2 overlap at end portions, and such a plurality of head chip units are arranged in the transport direction D2, and thus are configured to eject inks of a plurality of colors such as CMYK. Or, each of the head chips 23, 24, 25 . . . illustrated in FIG. 2 may be configured to include four nozzle groups respectively corresponding to the CMYK inks.

In the overlapping portions (the overlapping portions 26a, 26b, for example) where the formation ranges of the first nozzle group and the second nozzle group configured to eject ink of the same color overlap, the plurality of head chips constituting the print head 21 are assembled to form an ideal disposition in which each position of the nozzles 27 of the first nozzle group and each position of the nozzles 27 of the second nozzle group align in the longitudinal direction D1. However, realization of such an ideal disposition in a strict sense by all of the print heads 21 mass produced with the plurality of head chips assembled to the print heads 21 is difficult. That is, the first nozzle group and the second nozzle group configured to eject ink of the same color are formed on different head chips, and thus, due to errors and the like in an assembly accuracy of the head chips, deviation may occur in the longitudinal direction D1 between the positions of the nozzles 27 in the first nozzle group and the positions of the nozzles 27 in the second nozzle group in the overlapping portion of the first nozzle group and the second nozzle group. The degree of such deviation differs for each individual print head 21. In the present exemplary embodiment, a technique for suppressing deterioration in print quality in a switching portion between usage of the first nozzle group and usage of the second nozzle group is caused by such deviation.

The printing unit 20 achieves printing on the printing medium P by transporting the printing medium P by the transport mechanism in the transport direction D2, and ejecting liquid by the print head 21 based on print data. The printing unit 20 (or a configuration (reference sign 1) that includes the printing unit 20) may be termed an ink jet printer. The liquid (droplet) ejected from the nozzles 27 by the print head 21 is termed a dot. However, in the present exemplary embodiment, the expression "dot" is used for convenience when describing image processing and print control process in a preliminary stage before dots are ejected.

2. Printing Control Process

Figure 3:
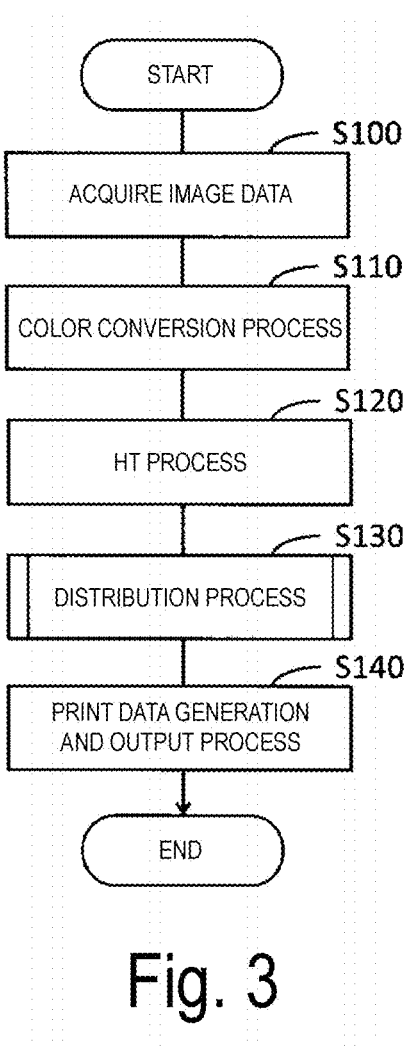
FIG. 3 is a flowchart illustrating a process executed by a control unit in accordance with a program A.

FIG. 3 illustrates the printing control process executed by the control unit 11 in accordance with the program A by using a flowchart.

The control unit 11 (image data acquiring unit 12) acquires image data that expresses a print target (step S100). The print target is, for example, text, an image, a computer graphic (CG), or a combination of these. For example, a user selects image data by operating the operation receiving unit 17. The image data acquiring unit 12 acquires the selected image data from a storage source. Examples of the storage source of the image data are various, including a storage medium built into the printing control apparatus 10, and a storage medium externally coupled to the printing control apparatus 10. The image data acquiring unit 12 delivers the acquired image data to the next step S110.

The image data delivered by the image data acquiring unit 12 to step S110 is, for example, red, green, and blue (RGB) data of a bitmap format that includes a gradation value (a gradation value expressed by 256 gradations of 0 to 255, for example) for each RGB per pixel. The image data acquiring unit 12 executes format conversion and resolution conversion on the acquired image data as necessary before delivering the image data to step S110.

In step S110, the control unit 11 (color converting unit 13) executes a color conversion process on the image data. The color conversion process is a process of converting image data (RGB data) into data (CMYK data) of an ink color space used for printing by the printing unit 20. As is known, the color converting unit 13 is configured to execute the color conversion process while referring to a table (color conversion look-up table) in which the gradation values of the RGB data are associated with the gradation values of the CMYK data. The image data (CMYK data) after the color conversion process is data of a bitmap format that includes a gradation value (a gradation value expressed by the 256 gradations of 0 to 255, for example) for each CMYK per pixel.

In step S120, the control unit 11 (HT processing unit 14) executes the HT process for each ink color (CMYK) on the image data after color conversion processing. The HT process converts data indicating 256 gradations into 1-bit data indicating 2 gradations or 2-bit data indicating 4 gradations, for example. The HT process can be executed using a dither method, a γ correction/error diffusion method, or the like. The image data after the HT process is termed HT data. The HT data is the data per ink color for driving the nozzle groups corresponding to each ink color, and specifies the presence or absence (ON/OFF) of dots per pixel.

In step S130, the control unit 11 (distribution processing unit 15) distributes the HT data generated in step S120 to data for driving each nozzle group of the print head 21. That is, the distribution processing unit 15 distributes the HT data into first HT data and second HT data for respectively driving the first nozzle group and the second nozzle group that share the overlapping portion and correspond to ink of the same color. Details of step S130 (distribution process) will be described below.

In step S140, the distribution processing unit 15 generates print data used for printing by the printing unit 20 in accordance with the result of the distribution process of step S130, and outputs the generated print data to the printing unit 20. That is, the distribution processing unit 15 sorts the pixels constituting the HT data after distribution in step S130 into the sequence of data to be transferred to each of the head chips corresponding to the print head 21. Such sorting is termed a rasterization process, and rasterized HT data is termed print data. The distribution processing unit 15 outputs (transfers) the print data generated via the rasterization process to the printing unit 20 via the communication IF 18. Based on the print data thus output, the printing unit 20 drives each of the nozzles 27 and executes printing based on the data of the pixels assigned to each of the nozzles 27. As a result, the print target on which the image data acquired in step S100 is expressed is reproduced on the printing medium P.

3. Details of Distribution Process (First Exemplary Embodiment)

Figure 4:
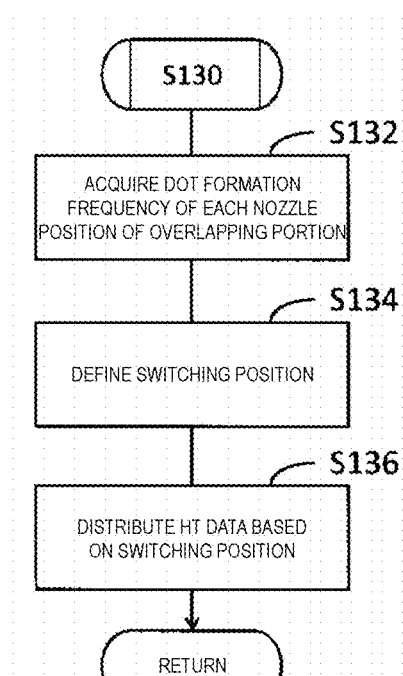
FIG. 4 is a flowchart illustrating details of step S130 of a first exemplary embodiment.

FIG. 4 illustrates details of step S130 by using a flowchart.

Figure 5:
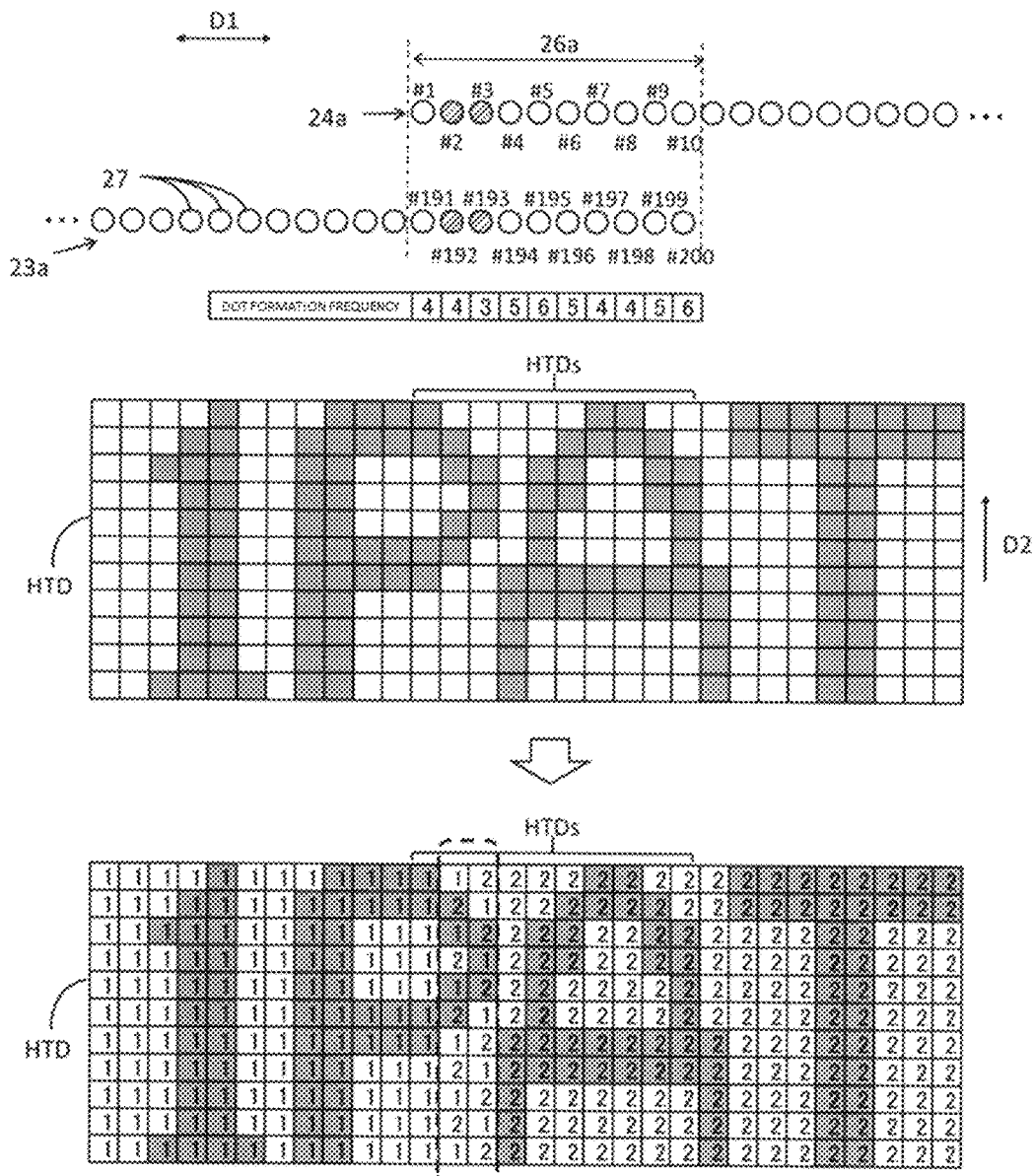
FIG. 5 is a diagram for explaining step S130 of the first exemplary embodiment.

FIG. 5 is a diagram for explaining step S130, and illustrates a correspondence relationship between a certain set of the first nozzle group and the second nozzle group, and HT data subject to the distribution process.

FIG. 5 illustrates, as an example of a combination of the first nozzle group and the second nozzle group corresponding to ink of the same color, a portion of the nozzle group 23a formed on the head chip 23 (FIG. 2) and configured to eject the K ink, and a portion of the nozzle group 24a formed on the head chip 24 (FIG. 2) and configured to eject the K ink. Note that, while the number of nozzles 27 per nozzle group illustrated in FIG. 2, and the number of nozzles 27 constituting the nozzle group illustrated in FIG. 5 (and FIG. 7 described below) differ, the inconsistency is merely due to restrictions in space in the drawings and each drawing is merely an illustration. The descriptions are unproblematic.

In the example in FIG. 5, one nozzle group includes 200 nozzles 27 aligned equally spaced apart in the nozzle alignment direction (longitudinal direction D1). Further, for convenience of explanation of FIG. 5, nozzle numbers #1 to #200 are assigned to the 200 nozzles 27 constituting one nozzle group, from a first end side (left side in FIG. 5) to a second end side (right side in FIG. 5) in the longitudinal direction D1. In the example in FIG. 5, the range of the 10 nozzles 27 of nozzle numbers #191 to #200 of the nozzle group 23a, and the range of the 10 nozzles 27 of nozzle numbers #1 to #10 of the nozzle group 24a overlap and form the overlapping portion 26a.

In step S132, the distribution processing unit 15 acquires a dot formation frequency of each nozzle position in the overlapping portion specified by, among the HT data generated in step S120, specific HT data corresponding to the overlapping portion. The HTD illustrated in FIG. 5 is, among the HT data generated in step S120, one portion of the data specifying the ON/OFF state of the dots of the K ink per pixel. Each rectangle constituting the HTD is an individual pixel of HTD. Further, in the example in FIG. 5, HTD is data expressing some kind of character string "1PAT" by dot ON/OFF. In the HTD, a white rectangle is a pixel with the dot (dot of the K ink) OFF, and a gray rectangle is a pixel with the dot (dot of the K ink) ON.

The HT data is matrix-like data in which the vertical direction corresponds to the transport direction D2 and the horizontal direction corresponds to the longitudinal direction D1. The resolution in the horizontal direction corresponds to the print resolution in the longitudinal direction D1 of the print head 21 (the number of nozzles 27 per inch in the longitudinal direction D1). The relative positional relationship between the print head 21 and the HT data in the longitudinal direction D1 is determined in accordance with printing conditions (for example, conditions such as a size of the printing medium P, a width of left and right edges (margins) of the printing medium P) already specified when the print control process (FIG. 3) starts. Further, the range of each overlapping portion in the longitudinal direction D1 of the print head 21 is also predetermined. As a result, based on the range of each overlapping portion and such a relative positional relationship between the print head 21 and the HT data in the longitudinal direction D1, the distribution processing unit 15 can extract the range of the HT data corresponding to the overlapping portion as specific HT data. The HTDs, which is a portion of the HTD, illustrated in FIG. 5 is specific HT data corresponding to the overlapping portion 26a of the nozzle group 23a and the nozzle group 24a.

The nozzle position in the overlapping portion is the nozzle position in the nozzle alignment direction (longitudinal direction D1) within the overlapping portion. When the 10 nozzles 27 of the nozzle group 23a, and the 10 nozzles 27 of the nozzle group 24a overlap and form the overlapping portion 26a as in the example in FIG. 5, the 10 nozzle positions exist in the overlapping portion 26a. For example, the positions in the longitudinal direction D1 of the nozzle 27 of nozzle number #191 of the nozzle group 23a, and the nozzle 27 of nozzle number #1 of the nozzle group 24a correspond to one nozzle position within the overlapping portion 26a.

The specific HT data is configured in pixel rows having a one-to-one correspondence with the nozzle positions of the overlapping portion. When the overlapping portion 26a includes 10 nozzle positions as in the example in FIG. 5, the HTDs (specific HT data) corresponding to the overlapping portion 26a is a group (region) of 10 pixel rows. One pixel row includes a plurality of pixels aligned in the transport direction D2. Here, the distribution processing unit 15 targets each of the pixel rows corresponding to the nozzle positions of the overlapping portion, counts the dot formation frequency of each pixel row, and sets the dot formation frequency of each pixel row as the dot formation frequency per nozzle position corresponding to each pixel row. The dot formation frequency indicates the ratio of dot ON pixels within one pixel row to the number of pixels constituting the pixel row. However, the number of dot ON pixels within one pixel row may be simply set as the dot formation frequency of the pixel row.

In FIG. 5, the dot formation frequency per pixel row constituting the HTDs is indicated by the number of dot ON pixels within each pixel row. That is, according to the example in FIG. 5, the dot formation frequencies for the 10 nozzle positions in the overlapping portion 26a are, in the order from the first end side to the second end side in the longitudinal direction D1, 4, 4, 3, 5, 6, 5, 4, 4, 5, 6.

In step S134, the distribution processing unit 15 defines the switching position of the first nozzle group and the second nozzle group in the overlapping portion, based on the dot formation frequency of each nozzle position in the overlapping portion acquired in step S132. In this case, the distribution processing unit 15 sets a predetermined number of nozzle positions that are in sequence and included in the overlapping portion as a single unit (nozzle position range), and calculates the total of the dot formation frequencies for each nozzle position range. Here, two nozzle positions that are in sequence and included in the overlapping portion are set as a single unit (nozzle position range), and the nozzle position range is termed a nozzle position pair. However, the nozzle position range may be a range of three or more nozzle positions in sequence.

With reference to the dot formation frequency of each nozzle position illustrated in FIG. 5, the total of the dot formation frequencies of the nozzle position pair closest to the first end side of the overlapping portion 26a in the longitudinal direction D1 (the pair of the position of the nozzle 27 of nozzle number #191 of the nozzle group 23a and the nozzle 27 of nozzle number #1 of the nozzle group 24a, and the position of the nozzle 27 of nozzle number #192 of the nozzle group 23a and the nozzle 27 of nozzle number #2 of the nozzle group 24a) is 4+4=8. The distribution processing unit 15 thus calculates the total of the dot formation frequencies of all of the nozzle position pairs included in the overlapping portion, and defines the nozzle position pair (nozzle position range) having the smallest sum total of the dot formation frequencies as the switching position in the overlapping portion.

With reference to the dot formation frequency of each nozzle position illustrated in FIG. 5, the total of the dot formation frequencies of the pair of the position of the nozzle 27 of nozzle number #192 of the nozzle group 23a and the nozzle 27 of nozzle number #2 of the nozzle group 24a, and the position of the nozzle 27 of nozzle number #193 of the nozzle group 23a and the nozzle 27 of nozzle number #3 of the nozzle group 24a is 4+3=7, which is the smallest among the totals of the dot formation frequencies of each nozzle position pair included in the overlapping portion 26a. Thus, in the overlapping portion 26a, the pair of the position of the nozzle 27 of nozzle number #192 of the nozzle group 23a and the nozzle 27 of nozzle number #2 of the nozzle group 24a, and the position of the nozzle 27 of nozzle number #193 of the nozzle group 23a and the nozzle 27 of nozzle number #3 of the nozzle group 24a (the smallest dot formation frequency position pair) is defined as the switching position. In FIG. 5, each of the nozzles 27 corresponding to such a smallest dot formation frequency position pair is indicated by hatching for easy identification.

Here, a plurality of nozzle position pairs (nozzle position ranges) having the smallest sum total of dot formation frequencies may exist in the overlapping portion. For example, the dot formation frequency of one nozzle position and the dot formation frequency of the other nozzle position of one nozzle position pair (a first nozzle position pair) included in the overlapping portion may be 4 and 3, respectively (sum total of dot formation frequencies of the first nozzle position pair=7), and the dot formation frequency of one nozzle position and the dot formation frequency of the other nozzle position of the other nozzle position pair (a second nozzle position pair) included in the overlapping portion may be 6 and 1, respectively (sum total of dot formation frequencies of the second nozzle position pair=7). Here, assume that, as a result of calculating the sum total of the dot formation frequencies of all nozzle position pairs included in the overlapping portion, 7 was the smallest sum total. In such a case, the distribution processing unit 15 defines, among the plurality of nozzle position pairs (nozzle position ranges) having the smallest sum total of dot formation frequencies, the nozzle position range having a smallest maximum value of the dot formation frequency as the switching position in the overlapping portion (step S134).

When the first nozzle position pair and the second nozzle position pair described above are compared, the maximum value of the dot formation frequency of each nozzle position of the first nozzle position pair is 4, and the maximum value of the dot formation frequency of each nozzle position of the second nozzle position pair is 6. Thus, the distribution processing unit 15 defines, among the first nozzle position pair and the second nozzle position pair having the smallest sum total of the dot formation frequencies, the first nozzle position pair having a smallest maximum value of the dot formation frequency as the switching position. According to the configuration, the distribution processing unit 15 can define the nozzle position pair (nozzle position range) corresponding to the position within the specific HT data having the impact as small as possible on print quality (least likely to have noticeable image deterioration caused by misalignment between the first nozzle group and the second nozzle group) as the switching position.

In step S136, the distribution processing unit 15 distributes the HT data, based on the switching position defined in step S134. "Distributes the HT data" refers to a process of determining the nozzle group to which the pixels constituting the HT data are to be distributed (assigned). Note that, for the HT data other than the specific HT data, there is just one option for the nozzle group serving as the distribution destination, making distribution extremely simple. For example, the data of the HTD illustrated in FIG. 5 on the first end side (left side) of the HTDs in the longitudinal direction D1 is distributed in its entirety to the nozzle group 23a (nozzles 27 of the nozzle group 23a). Similarly, the data of the HTD illustrated in FIG. 5 on the second end side (right side) of the HTDs in the longitudinal direction D1 is distributed in its entirety to the nozzle group 24a (nozzles 27 of the nozzle group 24a).

In the present embodiment, when the first nozzle group and the second nozzle group are configured to eject ink of the same color and share the overlapping portion are assumed, the HT data for driving the first nozzle group is termed the first HT data, and the HT data for driving the second nozzle group is termed the second HT data as a matter of convenience. When, in the relationship between the nozzle group 23a and the nozzle group 24a illustrated in FIG. 5, the nozzle group 23a is termed the first nozzle group and the nozzle group 24a is termed the second nozzle group, the data distributed into the nozzle group 23a corresponds to the first HT data and the data distributed into the nozzle group 24a corresponds to the second HT data.

The distribution processing unit 15 distributes the specific HT data of the HT data as described below. First, among the specific HT data corresponding to the overlapping portion, the data positioned on the first nozzle group side of the defined switching position (the center side of the first nozzle group) in the overlapping portion is distributed in its entirety into the first nozzle group. Similarly, among the specific HT data corresponding to the overlapping portion, the data positioned on the second nozzle group side of the defined switching position (the center side of the second nozzle group) in the overlapping portion is distributed in its entirety into the second nozzle group. With reference to the example in FIG. 5, among the HTDs, the data positioned on the center side of the nozzle group 23a (first nozzle group) of the smallest dot formation frequency position pair (switching position) indicated by hatching is distributed in its entirety to the nozzle group 23a (the nozzles 27 of the nozzle group 23a). Further, among the HTDs, the data positioned on the center side of the nozzle group 24a (second nozzle group) of the smallest dot formation frequency position pair (switching position) indicated by hatching is distributed in its entirety into the nozzle group 24a (the nozzles 27 of the nozzle group 24a).

Note that the lower section in FIG. 5 indicates the HTD distributed in step S136. "1" or "2" in each pixel of the HTD in the lower section indicates a nozzle group among the nozzle group 23a or 24a into which the pixel has been distributed. A pixel with "1" corresponds to data distributed into the nozzle group 23a (first nozzle group), that is, the first HT data, and a pixel with "2" corresponds to the data distributed into the nozzle group 24a (second nozzle group), that is, the second HT data.

The distribution processing unit 15 distributes, among the specific HT data corresponding to the overlapping portion, each pixel constituting the pixel row corresponding to the nozzle position pair (nozzle position range) of the switching position defined in the overlapping portion into the first HT data and the second HT data at a predetermined distribution ratio. Here, the predetermined distribution ratio is 1:1, for example. According to the lower section of FIG. 5, it is understood that, among the HTDs, the two pixel rows corresponding to the smallest dot formation frequency position pair (switching position) indicated by hatching is surrounded by a dashed line, and the distribution processing unit 15 has alternately distributed each pixel constituting the two pixel rows into the nozzle group 23a (first nozzle group) and the nozzle group 24a (second nozzle group).

While, in FIG. 5, just the relationship between the HTD and the nozzle groups 23a, 24a corresponding to the K ink is illustrated, in step S130, naturally the switching position in the overlapping portion is defined in accordance with the HT data and the HT data is distributed based on the defined switching position for each of other ink colors (CMY). That is, the distribution processing unit 15 is configured to define a switching position for each of the ink colors and each of the overlapping portions.

In step S140 after step S130 (distribution process), the distribution processing unit 15 associates the data of each pixel of the HT data with the nozzles 27 of the nozzle groups of the print head 21 of the distributed destination in step S130 as print data, and actually outputs the data. As a result, as indicated in the lower section of FIG. 5, the data (first HT data) of a pixel denoted by "1" is output to the nozzle group 23a (the head chip 23 that includes the nozzle group 23a) to drive the nozzles 27 of the nozzle group 23a, and the data (second HT data) of a pixel denoted by "2" is output to the nozzle group 24a (head chip 24 that includes the nozzle group 24a) to drive the nozzles 27 of the nozzle group 24a.

Thus, according to the present embodiment, the printing apparatus 1 executes printing by the print head 21 that includes the first nozzle group configured to eject ink, the second nozzle group configured to eject ink of the same color as the ink of the first nozzle group, and the overlapping portion where the formation range of the first nozzle group and the formation range of the second nozzle group at least partially overlap. Further, the printing control apparatus 10 controls such printing. Then, the HT processing unit 14 generates HT data specifying the presence or absence of dots of each pixel, based on image data (step S120), and the distribution processing unit 15 distributes the HT data into the first HT data for driving the first nozzle group and the second HT data for driving the second nozzle group (step S130). At this time, the distribution processing unit 15 defines the switching position between the first nozzle group and the second nozzle group in the overlapping portion, based on the dot formation frequency of each nozzle position in the overlapping portion specified by, among the HT data, the specific HT data corresponding to the overlapping portion (steps S132, S134), and distributes the specific HT data into the first HT data and the second HT data, based on the switching position (step S136).

That is, the switching position of the first nozzle group and the second nozzle group is defined based on the dot formation frequency of each nozzle position in the overlapping portion, allowing the switching position to be defined in the most appropriate position in the overlapping portion in accordance with the content of the image data (distribution mode of the dots of the HT data), regardless of the presence or absence of a longitudinally recorded line such as disclosed in JP-A-2014-008660. Further, with the switching position being based on the dot formation frequency of each nozzle position in the overlapping portion, the position having the lowest dot formation frequency (the impact as small as possible on print quality), such as the nozzle position range having the smallest sum total of the dot formation frequencies, for example, can be defined as the switching position to switch between the driving of the first nozzle group and the driving of the second nozzle group. As a result, even when misalignment exists between the first nozzle group and the second nozzle group in the overlapping portion, a favorable print quality that minimizes image quality deterioration (color unevenness, line wobbliness, and the like, for example) caused by the misalignment can be achieved.

As described above, the expressions first nozzle group, second nozzle group, first HT data, and second HT data are used as a matter of convenience for describing the present exemplary embodiment when a focus is placed on two certain nozzle groups that are configured to eject ink of the same color and share the overlapping portion. For example, in a view from an upstream side to a downstream side in the transport direction D2, the nozzle group on the left side and the nozzle group on the right side of the two nozzle groups that are configured to eject ink of the same color and share the overlapping portion can be respectively termed the first nozzle group and the second nozzle group. However, for example, when a focus is placed on a nozzle group on the right side (second nozzle group) and a nozzle group that exists further on the right of the nozzle group on the right side (second nozzle group), the nozzle group on the right side (second nozzle group) is termed the first nozzle group, and the nozzle group that exists further on the right side is termed the second nozzle group. Thus, naturally data termed the first HT data and the second HT data when a focus is placed on the two certain nozzle groups may be termed in reverse when the combination of the nozzle groups focused upon changes.

The frequency by which the control unit 11 (distribution processing unit 15) defines the switching position in accordance with the image data (HT data) is various. For example, the distribution processing unit 15 can define the switching position in the overlapping portion in accordance with the HT data of the page unit for each printing page, that is, each time the HT data of a page unit is obtained from the HT processing unit 14, and distribute the HT data of the page unit, based on the defined switching position. Or, the distribution processing unit 15 defines the switching position at a frequency smaller than a page unit. For example, the distribution processing unit 15 may set an image region of a predetermined size when one page is divided at a predetermined length in the transport direction D2 as a unit of processing, and define the switching position in the overlapping portion in accordance with the HT data each time the HT data corresponding to such an image region of a predetermined size is obtained from the HT processing unit 14, and distribute the HT data, based on the defined switching position.

4. Second Exemplary Embodiment

The exemplary embodiment described above is suitably termed the first exemplary embodiment.

Next, a second exemplary embodiment included in the exemplary embodiments will be described. In the second exemplary embodiment, elements that differ from the elements of the first exemplary embodiment are primarily described.

Figure 6:
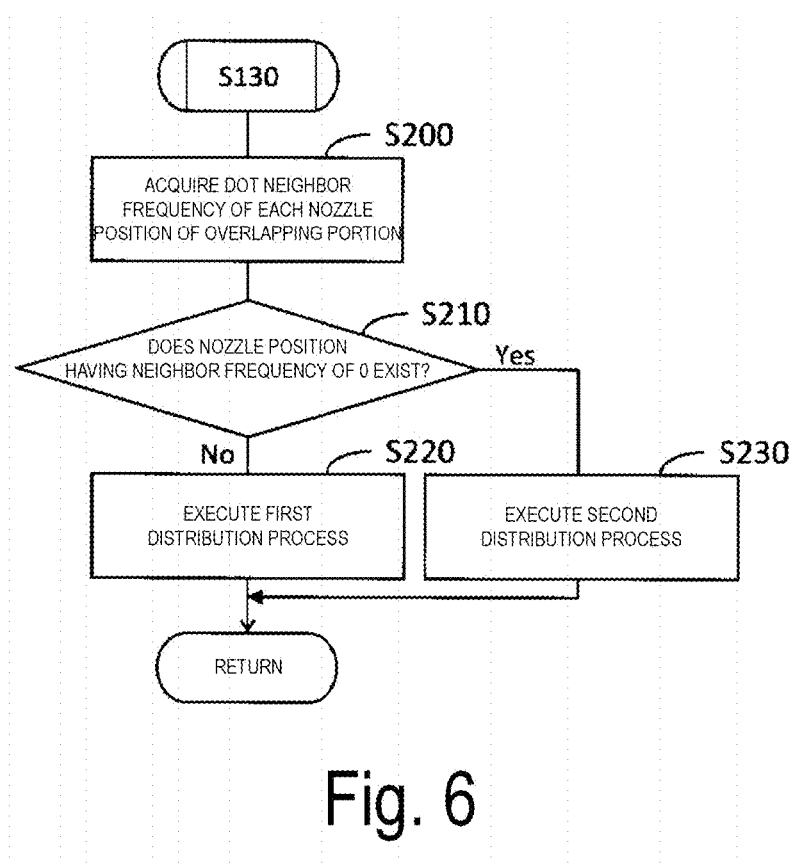
FIG. 6 is a flowchart illustrating details of step S130 of a second exemplary embodiment.

FIG. 6 illustrates the details of step S130 according to the second exemplary embodiment by using a flowchart.

Figure 7:
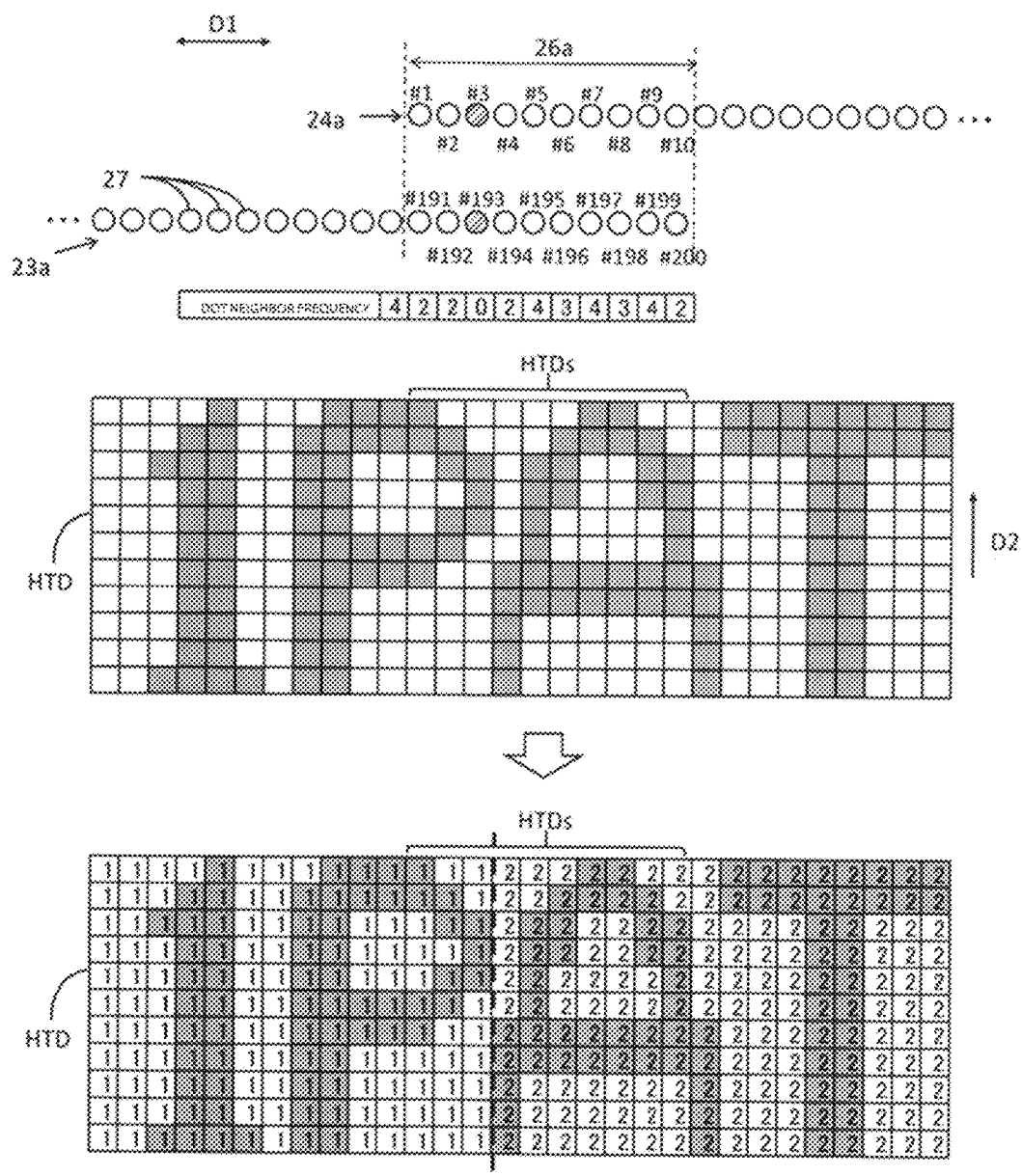
FIG. 7 is a diagram for explaining step S230 of the second exemplary embodiment.

FIG. 7 is a diagram for explaining step S230 (FIG. 6) according to the second exemplary embodiment, and illustrates a correspondence relationship between a certain set of the first nozzle group and the second nozzle group, and HT data subject to the distribution process, and the like. The illustration manner of FIG. 7 is substantially the same as the illustration manner of FIG. 5.

In step S200, the distribution processing unit 15 acquires a dot neighbor frequency per nozzle position in the overlapping portion specified by, among the HT data generated in step S120, specific HT data corresponding to the overlapping portion. The distribution processing unit 15 sequentially sets each pixel row corresponding to each nozzle position of the overlapping portion as a target pixel row, and determines whether the dot specified in the target pixel row and the dot specified in the pixel row adjacent to the target pixel row (for example, adjacent on the second end side (right side in FIG. 7) in the longitudinal direction D1) are adjacent in the longitudinal direction D1. Then, when one dot in the target pixel row is adjacent to one dot in the adjacent pixel row, the number of dot neighbors of the target pixel row is counted as 1. The distribution processing unit 15 counts such a number of dot neighbors for the target pixel row. The dot neighbor frequency indicates the ratio of the number of dot neighbors of the target pixel row to the number of pixels constituting the target pixel row. However, the number of dot neighbors of the target pixel row may be simply set as the dot neighbor frequency of the target pixel row.

The distribution processing unit 15 sets the dot neighbor frequency of each target pixel row as the dot neighbor frequency of each nozzle position corresponding to the target pixel row.

In FIG. 7, the dot neighbor frequency of each pixel row constituting the HTDs is indicated by the number of dot neighbors of each pixel row. Further, in FIG. 7, the dot neighbor frequency (number of dot neighbors) of the pixel row adjacent to the HTDs of the HTD on the first end side (left side in FIG. 7) in the longitudinal direction D1 is also indicated. That is, according to the example in FIG. 7, the dot neighbor frequencies for one nozzle position adjacent to the overlapping portion 26a on the first end side in the longitudinal direction D1, and for the 10 nozzle positions in the overlapping portion 26a are, in the order from the first end side toward the second end side in the longitudinal direction D1, 4, 2, 2, 0, 2, 4, 3, 4, 3, 4, 2.

In step S210, the distribution processing unit 15 refers to the dot neighbor frequency of each nozzle position obtained in step S200 and determines whether a nozzle position having a dot neighbor frequency of 0 exists. Then, the flow advances to step S230 when a nozzle position having a dot neighbor frequency of 0 exists ("YES" in step S210), and advances to step S220 when a nozzle position having a dot neighbor frequency of 0 does not exist ("NO" in step S210). According to the example in FIG. 7, the dot neighbor frequency of the position (one nozzle position) of the nozzle 27 of nozzle number #193 of the nozzle group 23a and the nozzle 27 of nozzle number #3 of the nozzle group 24a is 0. Specifically, for each of the three dots constituting an end portion on the second end side in the longitudinal direction D1 of a character "P" expressed by the HTD, there is no adjacent dot on the second end side in the longitudinal direction D1. Thus, in the example in FIG. 7, the distribution processing unit 15 determines "YES" in step S210 and advances the flow to step S230.

The distribution processing unit 15, in step S220, executes a first distribution process and then ends step S130. On the other hand, the distribution processing unit 15, in step S230, executes a second distribution process and then ends step S130. The first distribution process of step S220 is the same as the distribution process (steps S132 to S136 in FIG. 4) described in the first exemplary embodiment, and thus a description is omitted here.

The second distribution process of step S230 will now be described.

In step S230, the distribution processing unit 15 defines the nozzle position having a dot neighbor frequency of 0 as the switching position between the first nozzle group and the second nozzle group in the overlapping portion. With reference to the dot neighbor frequency of each nozzle position illustrated in FIG. 7, the dot neighbor frequency of the position of the nozzle 27 of nozzle number #193 of the nozzle group 23a and the nozzle 27 of nozzle number #3 of the nozzle group 24a is 0, and therefore this position is defined as the switching position. In FIG. 7, each of the nozzles 27 corresponding to such a switching position is indicated by hatching for easy identification.

Further, in step S230, the distribution processing unit 15 distributes the HT data based on the defined switching position. Note that distribution of the HT data other than the specific HT data is as described in the first exemplary embodiment. The distribution processing unit 15 distributes the specific HT data of the HT data as described below. First, among the specific HT data corresponding to the overlapping portion, the data positioned on the first nozzle group side of the defined switching position (the center side of the first nozzle group) in the overlapping portion, and the data (pixel row) corresponding to the nozzle position as the switching position are all distributed into the first nozzle group. Further, among the specific HT data corresponding to the overlapping portion, the data positioned on the second nozzle group side of the defined switching position (the center side of the second nozzle group) in the overlapping portion are all distributed into the second nozzle group.

The lower section in FIG. 7 indicates the HTD distributed in step S230. A pixel denoted by "1" corresponds to data distributed into the nozzle group 23a (first nozzle group), that is, the first HT data, and a pixel denoted by "2" corresponds to the data distributed into the nozzle group 24a (second nozzle group), that is, the second HT data. According to the lower section in FIG. 7, it is understood that the HT data have been distributed into the first HT data and the second HT data, sandwiching a boundary (refer to the dashed line in the lower section in FIG. 7) between the HTDs of a pixel row corresponding to the position (switching position) of the nozzles 27 indicated by hatching and the pixel row adjacent to that pixel row on the second end side in the longitudinal direction D1.

In step S140 after step S130 in which the second distribution process of step S230 has been executed, the distribution processing unit 15 associates the data of each pixel of the HT data with the nozzles 27 of the nozzle groups of the print head 21 of the distributed destination in step S230 as print data, and actually outputs the data. As a result, as indicated in the lower section of FIG. 7, the data (first HT data) of a pixel denoted by "1" is output to the nozzle group 23a (the head chip 23 that includes the nozzle group 23a) to drive the nozzles 27 of the nozzle group 23a, and the data (second HT data) of a pixel denoted by "2" is output to the nozzle group 24a (head chip 24 that includes the nozzle group 24a) to drive the nozzles 27 of the nozzle group 24a.

According to such a second exemplary embodiment, the distribution processing unit 15 detects the neighbor frequency (dot neighbor frequency) of a dot and dots of an adjacent nozzle position for each nozzle position in the overlapping portion of the first nozzle group and the second nozzle group configured to eject ink of the same color (step S200) and, when a nozzle position having a dot neighbor frequency of 0 exists ("YES" in step S210), defines the nozzle position having the dot neighbor frequency of 0 as the switching position between the first nozzle group and the second nozzle group in the overlapping portion, and distributes the specific HT data into the first HT data and the second HT data, based on the switching position (second distribution process in step S230). On the other hand, when a nozzle position having a dot neighbor frequency of 0 does not exist in the overlapping portion ("NO" in step S210), similar to the first exemplary embodiment, the distribution processing unit 15 defines a nozzle position range (nozzle position pair, for example) as the switching position in the overlapping portion, based on the dot formation frequency of each nozzle position in the overlapping portion, and distributes the specific HT data into the first HT data and the second HT data, based on the switching position (distributes each pixel constituting the pixel row of the specific HT data corresponding to the nozzle position range defined as the switching position into the first HT data and the second HT data at a predetermined distribution ratio; first distribution process of step S220).

That is, the switching position of the first nozzle group and the second nozzle group is defined based on the dot neighbor frequency of each nozzle position in the overlapping portion, allowing the switching position to be defined in the most appropriate position in the overlapping portion in accordance with the content of the image data (distribution mode of the dots of the HT data), regardless of the presence or absence of a longitudinally recorded line such as disclosed in JP-A-2014-008660. Then, with the nozzle position having a dot neighbor frequency of 0 in the overlapping portion being defined as the switching position, the driving of the first nozzle group and the driving of the second nozzle group can be switched without substantial display of image quality deterioration caused by misalignment between the first nozzle group and the second nozzle group in the overlapping portion when such misalignment exists. Furthermore, in the second exemplary embodiment, the distribution process described in the first exemplary embodiment is executed when a nozzle position having a dot neighbor frequency of 0 does not exist in the overlapping portion. Thus, even when the misalignment exists, a favorable print quality that minimizes image quality deterioration caused by the misalignment can be achieved.

5. Other Exemplary Embodiments

The invention is not limited to the exemplary embodiments described above, and various aspects such as indicated below, for example, may be utilized.

In step S134 (FIG. 4), the distribution processing unit 15 sets a predetermined number of nozzle positions that are included in the overlapping portion in sequence as a unit (nozzle position range), and defines the nozzle position range having the smallest sum total of the dot neighbor frequencies as the switching position of the first nozzle group and the second nozzle group in the overlapping portion. However, the nozzle position range may be set as one nozzle position, and simply the nozzle position range having the smallest dot formation frequency may be defined as the switching position of the first nozzle group and the second nozzle group in the overlapping portion. In this case, in step S136, the distribution processing unit 15 distributes, among the specific HT data corresponding to the overlapping portion, each pixel constituting the pixel row (one row) corresponding to the nozzle position of the switching position defined in the overlapping portion into the first HT data and the second HT data at a predetermined distribution rate.

The first nozzle group and the second nozzle group corresponding to ink of the same color have formation ranges that at least partially overlap. This concept includes when the formation range of the first nozzle group and the formation range of the second nozzle group fully overlap. That is, the entire formation range of the first nozzle group (and the second nozzle group) may be the overlapping portion. In this case as well, the switching position of the first nozzle group and the second nozzle group in the overlapping portion is defined, and the first nozzle group and the second nozzle group are driven by the first HT data and the second HT data, respectively, using the switching position as a boundary.

With the first nozzle group and the second nozzle group corresponding to ink of the same color being formed on mutually different head chips, such misalignment of the first nozzle group and the second nozzle group as described above may occur. However, the first nozzle group and the second nozzle group corresponding to ink of the same color may be formed on a common head chip. In this case, misalignment between the first nozzle group and the second nozzle group is basically considered nonexistent. However, the printing medium P transported by the transport mechanism may be inclined with respect to the transport direction D2, and thus transported to the print head 21 in an inclined state. In this case, even when the nozzles 27 of the first nozzle group and the nozzles 27 of the second nozzle group in the overlapping portion of the first nozzle group and the second nozzle group are disposed without misalignment, spacing different from the spacing between lines printed on the printing medium P by the nozzles 27 of the first nozzle group of the overlapping portion may occur between a line printed on the printing medium P by the nozzles 27 of the first nozzle group of the overlapping portion and a line printed on the printing medium P by the nozzles 27 of the second nozzle group of the overlapping portion. The occurrence of such different spacing may be visually recognized as deterioration in print quality. When the present exemplary embodiment is applied under such circumstances, the position in the overlapping portion having the impact as small as possible on the printing result can be defined as the switching position based on the image data (HT data), and thus deterioration in print quality can be suppressed.

The print head 21 illustrated in FIG. 2 is a line head fixed in the printing unit 20. However, the present exemplary embodiment may be applied to a printing apparatus that includes a so-called serial-type print head that is mounted on a carriage and moved in a predetermined direction by the carriage. Specifically, assume that the nozzle alignment direction of each nozzle group is not parallel with such a direction D1 as illustrated in FIG. 2, and the head chips are disposed in the transport direction D2 on the print head to be made parallel with the transport direction D2 (with the end portions overlapping one another). In this case, the direction D1 is termed the main scanning direction D1 of the print head. That is, printing by a serial method can be achieved by repeatedly transporting the printing medium P in the transport direction D2 by the transport mechanism, and executing ink ejection by the print head in association with the movement of the print head in the main scanning direction D1 by the carriage, in an alternating manner. In a printing apparatus that includes such a serial-type print head, misalignment in the transport direction D2 may occur between the first nozzle group and the second nozzle group corresponding to ink of the same color due to an assembly error of the head chip, or the like. Thus, application of the present exemplary embodiments to a printing apparatus that includes a serial-type print head achieves the advantage described above, that is the advantage of realizing a favorable print quality with minimal image quality deterioration caused by misalignment in a switching portion of usage of the first nozzle group and the second nozzle group when the misalignment exists.

This application claims priority under 35 U.S.C. § 119 to Japanese Patent Application No. 2017-203334, filed Oct. 20 2017. The entire disclosure of Japanese Patent Application No. 2017-203334 is hereby incorporated herein by reference.

What is claimed is:

1. A printing apparatus configured to execute printing by a print head including an overlapping portion where a formation range of a first nozzle group configured to eject ink and a formation range of a second nozzle group configured to eject ink of a same color as the first nozzle group at least partially overlap, the printing apparatus comprising:
a halftone processing unit configured to generate halftone data specifying a presence or absence of dots for each pixel based on image data; and
a distribution processing unit configured to distribute the halftone data into first halftone data for driving the first nozzle group, and second halftone data for driving the second nozzle group, wherein
the distribution processing unit is configured to define a switching position between the first nozzle group and the second nozzle group in the overlapping portion, based on a dot formation frequency of each nozzle position in the overlapping portion specified by, among the halftone data, specific halftone data corresponding to the overlapping portion, and distribute the specific halftone data into the first halftone data and the second halftone data, based on the switching position.

2. The printing apparatus according to claim 1, wherein the distribution processing unit is configured to define a nozzle position range formed by a predetermined number of nozzle positions that are in sequence and included in the overlapping portion as the switching position, and distribute each pixel constituting pixel rows within the specific halftone data corresponding to the nozzle position range defined as the switching position into the first halftone data and the second halftone data at a predetermined distribution ratio.

3. The printing apparatus according to claim 2, wherein the distribution processing unit is configured to define a nozzle position range having, among the nozzle position ranges included in the overlapping portion, a smallest sum total of the dot formation frequencies as the switching position.

4. The printing apparatus according to claim 3, wherein the distribution processing unit, when a plurality of the nozzle position ranges having a smallest sum total of the dot formation frequencies exist in the overlapping portion, is configured to define the nozzle position range having, among the plurality of nozzle position ranges, a smallest maximum value of the dot formation frequency as the switching position.

5. The printing apparatus according to claim 2, wherein the distribution processing unit is configured to detect, for each nozzle position in the overlapping portion, a neighbor frequency of a dot and a dot of a neighbor nozzle position and, when a nozzle position having a neighbor frequency of 0 exists, define the nozzle position having the neighbor frequency of 0 as the switching position and distribute the specific halftone data into the first halftone data and the second halftone data, based on the switching position and, when a nozzle position having a neighbor frequency of 0 does not exist, define the nozzle position range as the switching position, and distribute each pixel constituting the pixel row corresponding to the nozzle position range defined as the switching position into the first halftone data and the second halftone data at the distribution ratio.

6. A printing control apparatus configured to control printing by a print head including an overlapping portion where a formation range of a first nozzle group configured to eject ink and a formation range of a second nozzle group configured to eject ink of a same color as the first nozzle group at least partially overlap, the printing control apparatus comprising:

a halftone processing unit configured to generate halftone data specifying a presence or absence of dots for each pixel based on image data; and a distribution processing unit configured to distribute the halftone data into first halftone data for driving the first nozzle group, and second halftone data for driving the second nozzle group, wherein the distribution processing unit is configured to define a switching position between the first nozzle group and the second nozzle group in the overlapping portion, based on a dot formation frequency of each nozzle position in the overlapping portion specified by, among the halftone data, specific halftone data corresponding to the overlapping portion, and distribute the specific halftone data into the first halftone data and the second halftone data, based on the switching position.

* * * * *